United States Patent [19]

Wong

[11] Patent Number: 5,506,699
[45] Date of Patent: Apr. 9, 1996

[54] METHOD AND APPARATUS FOR CONVERTING A HALFTONE IMAGE INTO A CONTINUOUS TONE IMAGE

[76] Inventor: Ping W. Wong, 1443 Knowlton Dr., Sunnyvale, Calif. 94087

[21] Appl. No.: 53,643

[22] Filed: Apr. 27, 1993

[51] Int. Cl.⁶ ............................... H04N 1/40; G06K 9/40
[52] U.S. Cl. ..................... 358/456; 358/447; 358/458; 382/264
[58] Field of Search ................................ 358/455, 456, 358/457, 458, 461, 447; 382/54, 56

[56] References Cited

U.S. PATENT DOCUMENTS

| 4,853,970 | 8/1989 | Ott et al. | 382/54 |
| 4,962,542 | 10/1990 | Klees | 382/54 |
| 5,077,615 | 12/1991 | Tsuji | 358/298 |
| 5,243,444 | 9/1993 | Fan | 358/456 |

FOREIGN PATENT DOCUMENTS 0562813  9/1993  European Pat. Off. .......... H04H 1/40

OTHER PUBLICATIONS

M. Analoui et al., "New Results on Reconstruction of Continuous–Tone from Halftone," *Proceedings of ICASSP*, Mar. 1992, pp. III 313–316.
Z. Fan, "Retrieval of Gray Images from Digital Halftones," *Proceedings of ISCAS*, May 1992, pp. 2477–2480.
S. Hein et al., "Halftone to Continuous–Tone Conversion of Error–Diffusion Coded Images," *Proceedings of IS&T/SPIE Symposium on Electronic Imaging*, Feb. 1993, pp. 1–30.
C. M. Miceli et al., "Inverse Halftoning," *Journal of Electronic Imaging*, vol. 1(2), Apr. 1992, pp. 143–151.
M. Y. Ting et al., "Error Diffused Image Compression Using a Halftone–to–Grayscale Decoder and Predictive Pruned Tree–Structured Vector Quantization," *IEEE Transactions on Image Processing*, pp. 1–13, 1992.
Hein, Sorin et al., "Reconstruction of Continuous Tone Images from Their Error–Diffused Halftone Version", *Human Vision, Visual Processing, and Digital Display IV*, Proceedings of the SPIE, vol. 1913, Feb. 1993, pp. 310–324.

*Primary Examiner*—Edward L. Coles, Sr.
*Assistant Examiner*—Allan A. Esposo

[57] ABSTRACT

A method and apparatus for converting a binary image into a gray scale image includes a pipeline having a number of nearly identical stages. At each stage, modifications occur to provide the gray scale image by following a sequence of steps including: (1) determining a sample mean value representing an averaging of pixel values within a neighborhood containing a selected pixel; (2) determining a weighted variation value representing pixel value variations within the neighborhood; and (3) adjusting the pixel value of the selected pixel toward the sample mean value if the difference between the pixel value and the sample mean value exceeds the weighted variation value. The adjustment to the pixel value is in the direction of the sample mean value. Preferably, the weighting of the variation value is different at each stage. At each stage along the pipeline, low pass filtering is provided to remove high frequency noise generated by the process.

18 Claims, 3 Drawing Sheets

METHOD AND APPARATUS FOR CONVERTING A HALFTONE IMAGE INTO A CONTINUOUS TONE IMAGE

TECHNICAL FIELD

The present invention relates to a method and apparatus for constructing a high quality gray scale image from a binary image.

BACKGROUND ART

"Halftoning" is the process of constructing a binary image, i.e. a bi-level image, from a gray scale image, i.e. a multi-level image. The constructed binary image can then be displayed by means of binary devices, such as newspaper printers and laser printers. An n-bit gray scale image is converted into an one-bit binary image perceived to contain a continuous tone. The gray scale image may be passed through a sequence of operators that assign pixel values of 1 or 0 for each pixel of the resulting binary image.

"Inverse halftoning" is the process of reconverting the binary image into an approximation of the original gray scale image. Inverse halftoning can be applied to a wide variety of binary image processing problems, such as scaling, tone correction, interchanging between halftone methods, facsimile image processing, and image compression. For example, a gray scale image may be constructed from a binary image, whereafter the gray scale image undergoes a processing operation and is finally rehalftoned.

A binary image is a two-dimensional array of pixels having pixel values limited to two levels. On the other hand, a gray scale image is a two-dimensional light intensity function $x(i,j)$, where i and j denote discrete pixel coordinates and where the pixel value at any pixel x is proportional to the gray level of the image at that point. For example, the gray scale image may be an eight-bit scale having 256 possible gray levels.

Halftoning methods that use algorithms can generally be classified into two different categories—ordered dither and error diffusion. Ordered dither can be described at a basic level as a procedure of converting the gray scale image by thresholding the gray input with a periodically repeated threshold matrix. Error diffusion can be described as "spreading out" the error between an input gray-scale pixel and its binary output over a small area of the binary image. A weighted combination of output errors from previously processed pixels with respect to the scanning strategy is added to the input pixel, and the sum is thresholded to produce the binary output. Thus, error diffusion provides a local average within any small area of the binary image to approximate the gray level in the corresponding area of the gray scale image.

The two types of halftoning produce binary images that are substantially different both with respect to structure and characteristics, e.g., the frequency spectra. Consequently, inverse halftoning methods designed for converting one type of halftone image generally do not work well for converting the other type. With regard to inverse halftoning of dithered images, one technique is to use a "neighborhood approach" using adaptive run-lengths of 1's and 0's (ABRL). This performs particularly well in a three-level cascade algorithm comprised of ABRL, statistical smoothing, and impulse removal Miceli et al , "Inverse Halftoning," *Journal of Electronic Imaging*, column, vol. 1, pages 143–151, April 1992.

With respect to inverse halftoning of error diffused images, the use of look-up tables has recently been suggested. Ting et al., "Error Diffused Image Compression Using a Halftone-to-Gray Scale Decoder and Predictive Pruned Tree-Structured Vector Quantization," submitted to *IEEE Transactions on Image Processing*, 1992. Ting et al. describe using a small window which is slid over the error diffused image. The content of the binary pixels in the window serves as an address to a look-up table. A gray level value is then retrieved as the constructed gray level of the center pixel in the window. Thus, the inverse halftoning procedure can be interpreted as a decoding operation, where the "decoder" is the look-up table that associates a particular gray level with a particular bit pattern. The look-up table is constructed by a training algorithm using a collection of test images in the same manner as designing vector quantizers. While this method of inverse halftoning of an error diffused image works reasonably well, the training of the look-up table is time consuming. Moreover, because error diffusion produces a binary image in which the local average within any small area of the image approximates the gray level of the corresponding small area of the original gray scale image, one can obtain very different bit patterns corresponding to the same local gray level by simply shifting a halftoning window a small amount in any direction. The different bit patterns will result in different addressing to the look-up table during inverse halftoning. On the other hand, one can generate very different binary images from the same gray scale image by merely changing the initial condition in the error diffusion process. This means that the correlation between a specific bit pattern with the original local gray level is not very high, and hence the performance of the look-up table approach is limited.

Low pass filtering is the conventional way of reconstructing gray scale images from binary images. However, while the error diffusion process can be interpreted as one that injects noise into the gray scale image primarily at the high frequency range, there are several reasons why low pass filtering alone does not produce inverse halftoned images of sufficient quality. Firstly, low pass filtering cannot remove all of the noise (i.e. error) purposefully introduced by the error diffusion process, since there are noise components at the low frequency range. Secondly, there may have been high frequency components in the original gray scale image, so that removal of noise at the high frequency range will also remove these desirable high frequency components. Low pass filters are not so selective as to unambiguously determine whether a high frequency component originated from the gray scale image or from the error diffusion process. An example of low pass filtering is one which uses a filter at one-half of the maximum possible bandwidth of the digital image, i.e., the cut-off frequency is at $f_s/4$, where $f_s$ is the sampling frequency. A significant amount of residue noise resulting from the error diffusion process will still remain at the output image. The residue noise cannot be removed by further low pass filtering unless the cut-off frequency of the filter is lowered significantly. However, lowering the cut-off frequency further would result in the removal of desired components, thereby generating an overly blurred image.

It is an object of the present invention to provide a method and apparatus for converting a binary image into a high quality gray scale image.

SUMMARY OF THE INVENTION

The above object has been met by a gray scale image-constructing method and apparatus which utilize non-linear statistical smoothing to distinguish between desired and undesired components of an image to be converted. In a preferred embodiment, errors generated during either a halftoning process or an inverse half-toning process are removed and a high quality gray scale image is constructed by using a pipeline of stages, with each stage having both low pass filtering and non-linear statistical smoothing.

The purpose of the low pass filter at each stage of the pipeline is to remove undesired high frequency components generated by the non-linear smoothing process. The low pass filters are preferably linear filters. Each of the filters may be a halfband filter, or the filters may have different cut-off frequencies with progression along the pipeline.

The non-linear statistical smoothing is performed on a pixel-by-pixel basis and includes selecting a neighborhood for each pixel within a binary image to be converted. A first value that represents an averaging of pixel values within the neighborhood is determined. Also determined is a second value that characterizes the amount of local variation among pixel values within the neighborhood. The pixel value of a selected pixel, typically the center pixel in the neighborhood, is adjusted only if the difference between the pixel value and the first value exceeds a weighted multiple of the second value. The adjustment is toward the first value. This is repeated one pixel at a time until each pixel has been considered, thereby forming a gray scale image. At the first stage, the gray scale image is then passed to the second stage for repeating the low pass filtering and non-linear statistical smoothing.

The center pixel in the selected neighborhood has the coordinates m,n. The size of the neighborhood ($R_{m,n}$) is not critical, but should be reasonably small. By way of example, the neighborhood may have a size of 3 by 3. The first value ($\mu_{m,n}$) is the sample mean of the pixel values in $R_{m,n}$. The second value ($v_{m,n}$) characterizes locally the amount of variations among the pixels within $R_{m,n}$. The pixel value ($x_{m,n}^{old}$) of the center pixel is compared with the thresholds $\mu_{m,n}+\gamma v_{m,n}$ and $\mu_{m,n}-\gamma v_{m,n}$, where $\gamma$ is a weighted multiple that is greater than or equal to 0 and is adjusted on a per-stage basis to obtain optimal performance. The value of the center pixel is modified to provide an adjusted pixel value ($x_{m,n}^{new}$) satisfying the condition:

$$x_{m,n}^{new} = \begin{cases} \mu_{m,n} + \gamma v_{m,n} & \text{if } x_{m,n}^{old} > \mu_{m,n} + \gamma v_{m,n} \\ \mu_{m,n} - \gamma v_{m,n} & \text{if } x_{m,n}^{old} < \mu_{m,n} - \gamma v_{m,n} \\ x_{m,n}^{old} & \text{otherwise.} \end{cases}$$

A window that defines the neighborhood "slides" across the input image in a pixel-by-pixel manner so as to consider each pixel in the input image. The output image is therefore a multi-level image. The output of each stage in the pipeline is the input to the subsequent stage. The signal that exits from the pipeline may be displayed, or printed using a multi-level printer, or may be caused to undergo a processing operation such as image compression.

While not critical, an example of a calculation of $v_{m,n}$ for measuring the local variation is the $r^{th}$ power norm centered at the sample mean. Thus, $$v_{m,n} = \left[ \frac{1}{\|R_{m,n}\|} \sum_{(i,j) \in R_{m,n}} |x_{i,j}^{old} - \mu_{m,n}|^r \right]^{1/r},$$

where $$\mu_{m,n} = \frac{1}{\|R_{m,n}\|} \sum_{(i,j) \in R_{m,n}} x_{i,j}^{old}$$

and where $\|R_{m,n}\|$ denotes the number of pixels in the neighborhood. In the special case where r=2, $v_{m,n}$ is identical to the sample standard deviation of the pixels in $R_{m,n}$.

An advantage of the present invention is that non-linear smoothing discriminates in the removal of high frequency components. Noise components introduced by error diffusion are removed, so that the resulting image is not blurred to the extent that is typical of using low pass filtering with a low cut-off frequency. A pixel value is modified only when the pixel value is statistically far away from the sample average within the neighborhood. Both $\mu_{m,n}$ and $v_{m,n}$ vary with the position of the window, so that statistical smoothing is performed strictly according to local statistics. When the window falls in a location that contains an edge of an image, the variation measure $v_{m,n}$ tends to be larger than in the case in which there is not an edge within the window. Consequently, the pixel value of a pixel is less likely to be modified when the pixel is near an edge. As a result, the smoothing operation is performed without overly blurring the image. Another advantage is that the invention may be applied equally well whether the binary-to-gray scale conversion is a conversion from a bi-tone to a continuous tone image or a conversion from a bi-level color approach to a multi-level color approach. For example, three parallel pipelines may be used to convert three bi-level color signals to three multi-level color signals to drive the different color guns of a computer monitor, thereby providing a greater color spectrum of an image at the monitor.

BEST MODE FOR CARRYING OUT THE INVENTION

Figure 1:
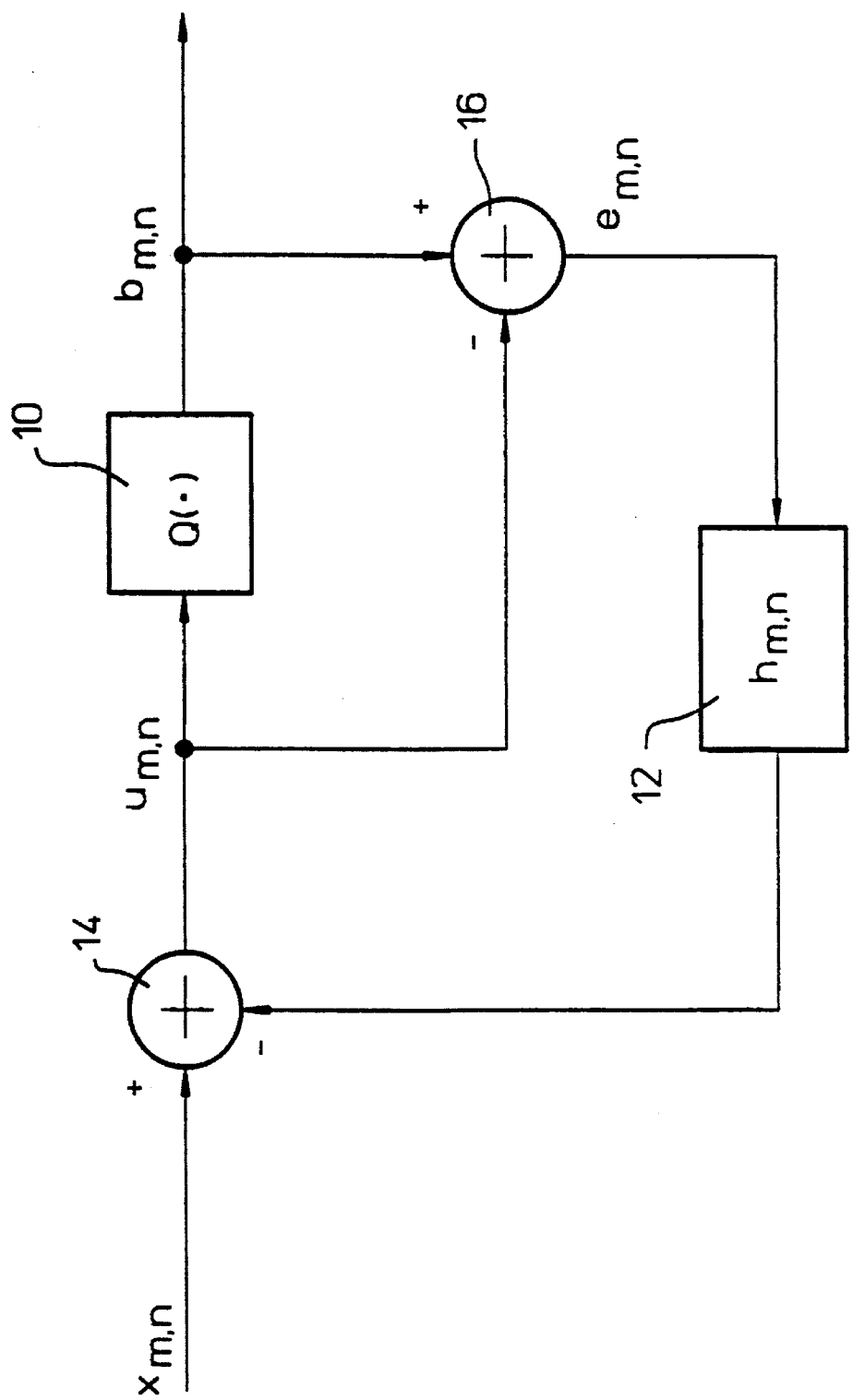
FIG. 1 is a block diagram schematically showing a prior art error diffusion halftoning system.

With reference to FIG. 1, a generic error diffusion apparatus is shown as including a binary quantizer Q(.) 10 and a digital filter 12. The input $x_{m,n}$ is a gray scale image having a dynamic range L, i.e., $x_{m,n} \in [0,L]$ for all m and n. The output $b_{m,n}$ is a halftoned version of $x_{m,n}$, wherein $b_{m,n} \in \{0, 1\}$. In the absence of a signal from the digital filter 12, the input passes unmodified through a summer 14 to the quantizer.

The threshold of the binary quantizer 10 is typically set at L/2. The output of the quantizer 10 is combined with the input at a second summer 16 to generate the signal $e_{m,n}$. The digital filter is a linear filter in a negative feedback loop. Thus, the filter 12 operates on the quantization error generated by the one-bit quantizer 10.

The error diffusion apparatus of FIG. 1 operates much in the manner of a predictive coder. The digital filter 12 has finite-extent input and output masks. Error diffusion "spreads out" the error between an input gray-scale pixel ($x_{m,n}$) and its binary equivalent ($b_{m,n}$) over a small area of the halftoned image. The digital filter 12 in the feedback loop is "causal" with respect to the scanning direction of a window along the gray scale image, so that only "past" errors are diffused.

Figure 2:
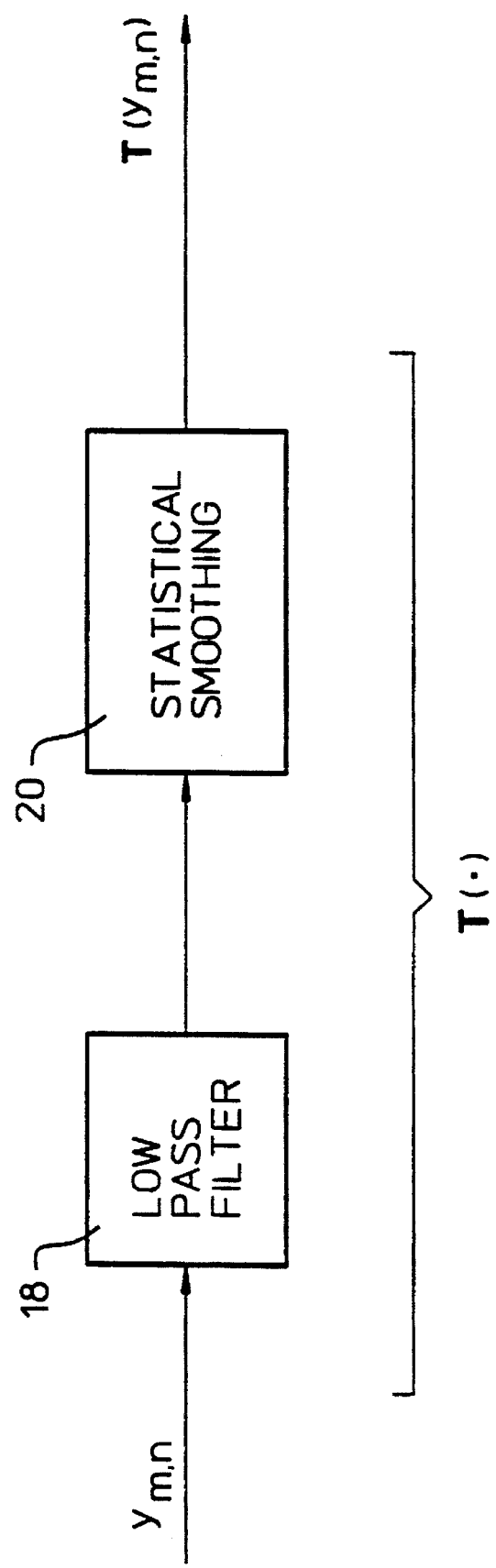
FIG. 2 is a block diagram schematically showing one stage of an inverse halftoning apparatus in accordance with the present invention.

An inverse halftoning procedure attempts to reproduce the gray scale image which was initially inputted to the apparatus of FIG. 1. With reference to FIG. 2, a stage of a pipeline apparatus for inverse halftoning is shown. The stage includes a low pass filter 18 and a statistical smoothing device 20. The stage is referred to by the designation T(.).

Figure 3:
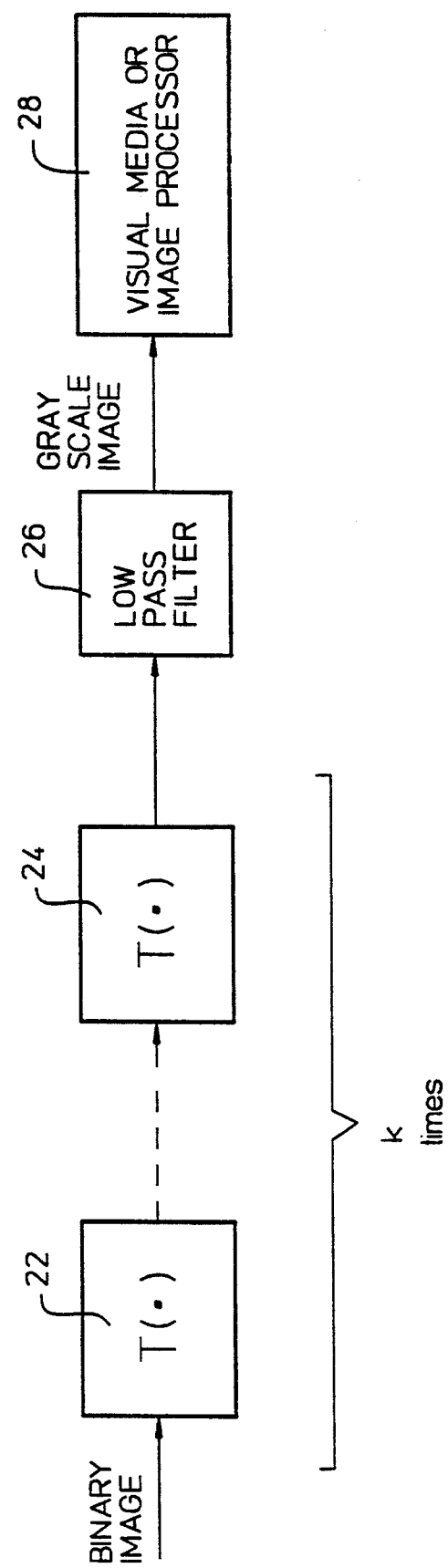
FIG. 3 is a block diagram schematically showing a pipeline inverse halftoning apparatus in accordance with the present invention.

As shown in FIG. 3, a pipeline for inverse halftoning of error diffused images includes a number (k) of the stages of FIG. 2.

Returning to FIG. 2, the purpose of the low pass filter at each stage is to remove the potentially unwanted high frequency components that are generated by the non-linear smoothing process at 20. The low pass filter may be a halfband filter to avoid overly blurring the reconstructed image $T(y_{m,n})$. Alternatively, the filters may vary along the pipeline with respect to the cut-off frequency, i.e., the k filters are not necessarily identical. Low pass filters are conventionally used in the art of inverse halftoning, so that the configuration of the filters is readily understood.

Non-linear statistical smoothing 20 is preferably performed by means of the following steps. For each pixel location (m,n), a small neighborhood $R_{m,n}$ that is centered by the pixel location is defined. The sample mean $\mu_{m,n}$ of the pixels in the neighborhood is computed. Also determined is a measure $v_{m,n}$ that characterizes locally the amount of variation among the pixels within the neighborhood. The value of the center pixel is compared with the threshold $\mu_{m,n}+\gamma v_{m,n}$ and $\mu_{m,n}-\gamma v_{m,n}$. The multiple $\gamma$ preferably is varied along the various stages 22 and 24 of FIG. 3. The weighted multiple should be greater than or equal to 0 and is preferably less than or equal to 1.

The value of the center pixel $(x_{m,n})$ is modified according to $$x_{m,n}^{new} = \begin{cases} \mu_{m,n} + \gamma v_{m,n} & \text{if } x_{m,n}^{old} > \mu_{m,n} + \gamma v_{m,n} \\ \mu_{m,n} - \gamma v_{m,n} & \text{if } x_{m,n}^{old} < \mu_{m,n} - \gamma v_{m,n} \\ x_{m,n}^{old} & \text{otherwise.} \end{cases}$$

The superscripts "old" and "new" refer to the value of the center pixel before and after, respectively, each statistical smoothing process along the pipeline of FIG. 3. The operation is repeated on a pixel-by-pixel basis over the entire image, wherein the window that defines neighborhood "slides" across the image.

An example of $v_{m,n}$ for measuring the local variation is the $r^{th}$ power norm centered at the sample mean. Thus, $$v_{m,n} = \left[ \frac{1}{\|R_{m,n}\|} \sum_{(i,j) \in R_{m,n}} |x_{i,j}^{old} - \mu_{m,n}|^r \right]^{1/r},$$

where $$\mu_{m,n} = \frac{1}{\|R_{m,n}\|} \sum_{(i,j) \in R_{m,n}} x_{i,j}^{old}$$

and where $\|R_{m,n}\|$ denotes the number of pixels in the neighborhood $R_{m,n}$. In the special case where r=2, $v_{m,n}$ is identical to the sample standard deviation of the pixels in the neighborhood. While other determinations of the local variation measure are possible, the above-identified determination of $v_{m,n}$ has been shown to function well in providing high quality inverse halftoning.

The operation of each non-linear statistical smoothing is such that a particular pixel value is changed only when it is statistically far away from the sample mean of its neighbors. If the value of the center pixel in the neighborhood differs from $\mu_{m,n}$ by more than $v_{m,n}$, the pixel value of the center pixel is adjusted towards the sample mean $\mu_{m,n}$. If the difference between the original pixel value is sufficiently close to the sample mean, the pixel value remains unchanged.

Both $\mu_{m,n}$ and $v_{m,n}$ vary with the position of the window that defines the neighborhood. Therefore, the statistical smoothing operation is performed strictly according to local statistics. When the window falls in an area that contains an edge of the image, the sample variant $v_{m,n}$ of the defined neighborhood $R_{m,n}$ tends to be larger than in the case in which the window does not contain an edge. It follows that the pixel value of the center pixel of a neighborhood is less likely to be adjusted when it is near the edge. Consequently, the non-linear statistical smoothing operation provides a gray scale image without overly blurring the image at its edges.

As can be seen from the formula above for determining $x_{m,n}^{new}$, a smaller value of $\gamma$ implies that it is more likely that the pixel value of the center pixel will exceed either the upper or lower threshold. Adjustments of the pixel values will therefore occur more frequently throughout the image. For this reason, it is expected that a smoother output image results in use with a smaller $\gamma$. In experiments in which the window had a size of 3 by 3 and r=2 in the determination of $v_{m,n}$, the best performance was obtained by setting the initial weighted multiple ($\gamma$) to 0.25 and then linearly increasing the weighted multiple along four stages 22–24 to reach a final value of 1.0. It was also found that varying the cut-off frequency along the low pass filters 18 of the various stages did not improve the reconstructed image.

As shown in FIG. 3, a final low pass filter 26 is provided to remove the unwanted high frequency components that may be generated at the final stage 24 of the pipeline. The resulting gray scale image may be presented for display at a monitor 28, or may be printed using a multi-level printer or may be caused to undergo some other form of image processing, such as compression.

The present invention has been described as one in which it is the center pixel in a defined neighborhood that is considered for adjustment. While this is preferred, it is possible to select some other pixel within the neighborhood. Moreover, each pixel within a neighborhood defined by a window may be considered for modification before relocation of the window. However, a loss of quality may result.

The invention is not restricted to conversion of a binary image into a continuous tone image. The invention applies equally well to a conversion from an image that is binary with respect to color into an image that is "gray scale," i.e. multi-level, with respect to color. That is, a "gray scale image" is defined herein as a multi-level image with respect to image-viewable factors such as tone or color. For example, a color monitor having a separate color gun for each of three primary colors may be driven by an apparatus in which three separate pipelines convert bi-level color images to gray scale color images for combination at the display screen.

I claim:

1. A method for converting a binary image into a gray scale image comprising:

(a) selecting a neighborhood of pixels in said binary image, each pixel having a pixel value $(X_{old})$ at one of two levels, said neighborhood including a selected pixel;

(b) determining a first value ($\mu$), said step of determining said first value including computing an average value of said pixel values of said pixels within said neighborhood;

(c) determining a second value (v), said step of determining said second value including selecting a numerical measure which represents a local variation of said pixel values among said pixels within said neighborhood, said step of determining said second value further including calculating said numerical measure;

(d) adjusting said second value (v) by a weighting ($\gamma$), including multiplying said second value (v) by said weighting ($\gamma$), resulting in a weighted variation ($\gamma$v);

(e) determining an adjusted pixel value ($x_{new}$) of said pixel value of said selected pixel, wherein $$x_{new} = \begin{cases} \mu + \gamma v, & \text{if } x_{old} > (\mu + \gamma v) \\ \mu - \gamma v, & \text{if } x_{old} < (\mu - \gamma v) \\ x_{old}, & \text{otherwise;} \end{cases}$$

(f) repeating steps (a)–(e) for other pixels of said binary image such that a gray scale image is formed; and (g) low pass filtering said gray scale image.

2. The method of claim 1 wherein determining the second value includes mathematically weighting said characterization of said variation of pixel values, thereby providing said second value.

3. The method of claim 2 further comprising repeating steps (a)–(f) for said gray scale image formed by said steps, wherein repeating steps (a)–(f) is performed with a different mathematical weighting in determining said second value.

4. The method of claim 1 wherein said selected pixel ($x_{m,n}$) is at coordinates m,n in a two-dimensional array of pixels and said first and second values are $\mu_{m,n}$ and $\gamma v_{m,n}$, respectively, said steps providing an adjusted pixel value ($x_{m,n}^{new}$) wherein $$x_{m,n}^{new} = \begin{cases} \mu_{m,n} + \gamma v_{m,n} & \text{if } x_{m,n}^{old} > \mu_{m,n} + \gamma v_{m,n} \\ \mu_{m,n} - \gamma v_{m,n} & \text{if } x_{m,n}^{old} < \mu_{m,n} - \gamma v_{m,n} \\ x_{m,n}^{old} & \text{otherwise.} \end{cases}$$

5. The method of claim 4 wherein said step of determining the second value ($\gamma v_{m,n}$) includes multiplying a weighted value ($\gamma$) times the local variation ($v_{m,n}$) of pixel values within said neighborhood ($R_{m,n}$) of pixels such that at the $r^{th}$ power norm $$v_{m,n} = \left[ \frac{1}{\|R_{m,n}\|} \sum_{(i,j) \in R_{m,n}} |x_{i,j}^{old} - \mu_{m,n}|^r \right]^{1/r},$$

where $$\mu_{m,n} = \frac{1}{\|R_{m,n}\|} \sum_{(i,j) \in R_{m,n}} x_{i,j}^{old}$$

and where $\|R_{m,n}\|$ denotes the number of pixels in the neighborhood.

6. The method of claim 1 wherein said binary image is a bi-level color image and wherein the formed gray scale image is a multi-level color image.

7. A method for converting a binary image into a gray scale image comprising:

providing a binary image in the form of a first two-dimensional element array of binary image elements, each binary image element in said element array having an element value;

constructing a first gray scale image in the form of a second two-dimensional element array of gray scale elements, said gray scale elements corresponding to said binary image elements in a one-to-one relationship, each gray scale element in said second element array having an element value, said step of constructing including;

(a) for each binary image element in said first two-dimensional element array, determining a first value representing an averaging of element values for binary image elements in a window containing said each binary image element;

(b) determining a second value representing element value variations within said window;

(c) assigning a third value to the gray scale element in said second array corresponding to said each binary image element, said assigning including selecting a third value that is between said element value of said each binary image element and said first value only if the difference between said element value and said first value exceeds a selected weighted multiple of said second value, said assigning including selecting a third value that is equal to said element value of said each binary image element only if the difference between said element value of said each binary image element and said first value is one of equal to and less than said weighted multiple of said second value;

low pass filtering said first gray scale image; and constructing a second gray scale image from said first gray scale image by following said sequence of steps for constructing said first gray scale image, the weighted multiple for constructing said second gray scale image being different than said weighted multiple for constructing said first gray scale image.

8. The method of claim 7 further comprising low pass filtering said second gray scale image.

9. The method of claim 7 further comprising constructing a third gray scale image from said second gray scale image using a weighted multiple different than said weighted multiples for constructing said first and second gray scale images.

10. The method of claim 7 wherein the step (c) of adjusting the element value is a step wherein the element value ($x_{m,n}^{old}$) is adjusted such that said adjusted value ($x_{m,n}^{new}$) satisfies the condition that $$x_{m,n}^{new} = \begin{cases} \mu_{m,n} + \gamma v_{m,n} & \text{if } x_{m,n}^{old} > \mu_{m,n} + \gamma v_{m,n} \\ \mu_{m,n} - \gamma v_{m,n} & \text{if } x_{m,n}^{old} < \mu_{m,n} - \gamma v_{m,n} \\ x_{m,n}^{old} & \text{otherwise,} \end{cases}$$

where $\mu_{m,n}$ is the first value, $\gamma$ is the weighted multiple and $v_{m,n}$ is the second value.

11. The method of claim 7 wherein providing the binary image is a step of providing an error diffused halftone image.

12. An apparatus for converting a binary image into a gray scale image comprising:

input means for providing a binary image;

an image processing pipeline having a plurality of stages, at least some of said stages including a low pass filter and a non-linear statistical smoothing means for determining on a pixel-by-pixel basis desired pixel values for a conversion of said binary image to a gray scale image, wherein for each pixel location (m,n) said desired pixel value ($x_{m,n}^{new}$) for said gray scale image is determined from the pixel value ($x_{m,n}^{old}$) of the input of said stage in accordance with the condition that $$x_{m,n}^{new} = \begin{cases} \mu_{m,n} + \gamma v_{m,n} & \text{if } x_{m,n}^{old} > \mu_{m,n} + \gamma v_{m,n} \\ \mu_{m,n} - \gamma v_{m,n} & \text{if } x_{m,n}^{old} < \mu_{m,n} - \gamma v_{m,n} \\ x_{m,n}^{old} & \text{otherwise,} \end{cases}$$

where $\mu_{m,n}$ is an average of pixel values within a pixel neighborhood including said pixel m,n and where $\gamma v_{m,n}$ is a weighted characterization of pixel value variations within said pixel neighborhood; and means for achieving one of visual presentation and image processing of said gray scale image converted by said image processing pipeline.

13. The apparatus of claim 12 wherein each non-linear statistical smoothing means has a different weighted multiple ($\gamma$).

14. The apparatus of claim 13 wherein each low pass filter has a different cut-off frequency.

15. The apparatus of claim 13 wherein each low pass filter is a halfband filter.

16. The apparatus of claim 12 wherein each non-linear statistical smoothing means has a weighted multiple ($\gamma$) greater than 0 and less than or equal to 1.

17. The apparatus of claim 12 wherein said input means provides an error diffused halftone image.

18. The apparatus of claim 12 wherein said input means is a source of a bi-level color image, said apparatus further comprising a plurality of said input means and a plurality of said image processing pipelines for combination of bi-level color images at said means for achieving one of visual presentation and image processing.

* * * * *